United States Patent [19]

Aldrovandi

[11] Patent Number: 4,848,219

[45] Date of Patent: Jul. 18, 1989

[54] TANK FOR COOLING MOZZARELLA CHEESES

[75] Inventor: Claudio Aldrovandi, Castelfranco Emilia, Italy

[73] Assignee: Dima S.R.L., Modena, Italy

[21] Appl. No.: 156,460

[22] Filed: Feb. 16, 1988

[30] Foreign Application Priority Data

Feb. 20, 1987 [IT] Italy ............................... 3357 A/87

[51] Int. Cl.⁴ ............................................. A01J 25/00
[52] U.S. Cl. ...................................... 99/455; 99/452; 99/460; 198/774
[58] Field of Search ................ 99/452, 453, 455, 460, 99/517, 535; 198/774, 776, 621

[56] References Cited

U.S. PATENT DOCUMENTS

| | | | |
|---|---|---|---|
| 1,726,419 | 8/1929 | Aldrich et al. ...................... | 198/774 |
| 3,570,389 | 3/1971 | Pontecorvo et al. ................. | 99/455 |
| 4,540,087 | 9/1985 | Mizumoto ........................... | 198/774 |
| 4,679,497 | 7/1987 | Tomatis ............................... | 99/460 X |
| 4,687,092 | 8/1987 | Ray .................................... | 198/774 X |

*Primary Examiner*—Timothy F. Simone
*Attorney, Agent, or Firm*—Herbert Dubno

[57] ABSTRACT

A tank for cooling mozzarella cheeses with a closed circuit conveyor belt at the outlet of machines for molding mozzarella cheeses from stretched cheese paste, in which the conveyor belt is formed by transversely spaced longitudinal bars with a connection and support structure with components projecting laterally outwardly from the top of the tank and in which means designed to cause the conveyor belt to perform a closed circuit movement with a slow outward stroke and a rapid return stroke are associated with these projecting components.

7 Claims, 2 Drawing Sheets

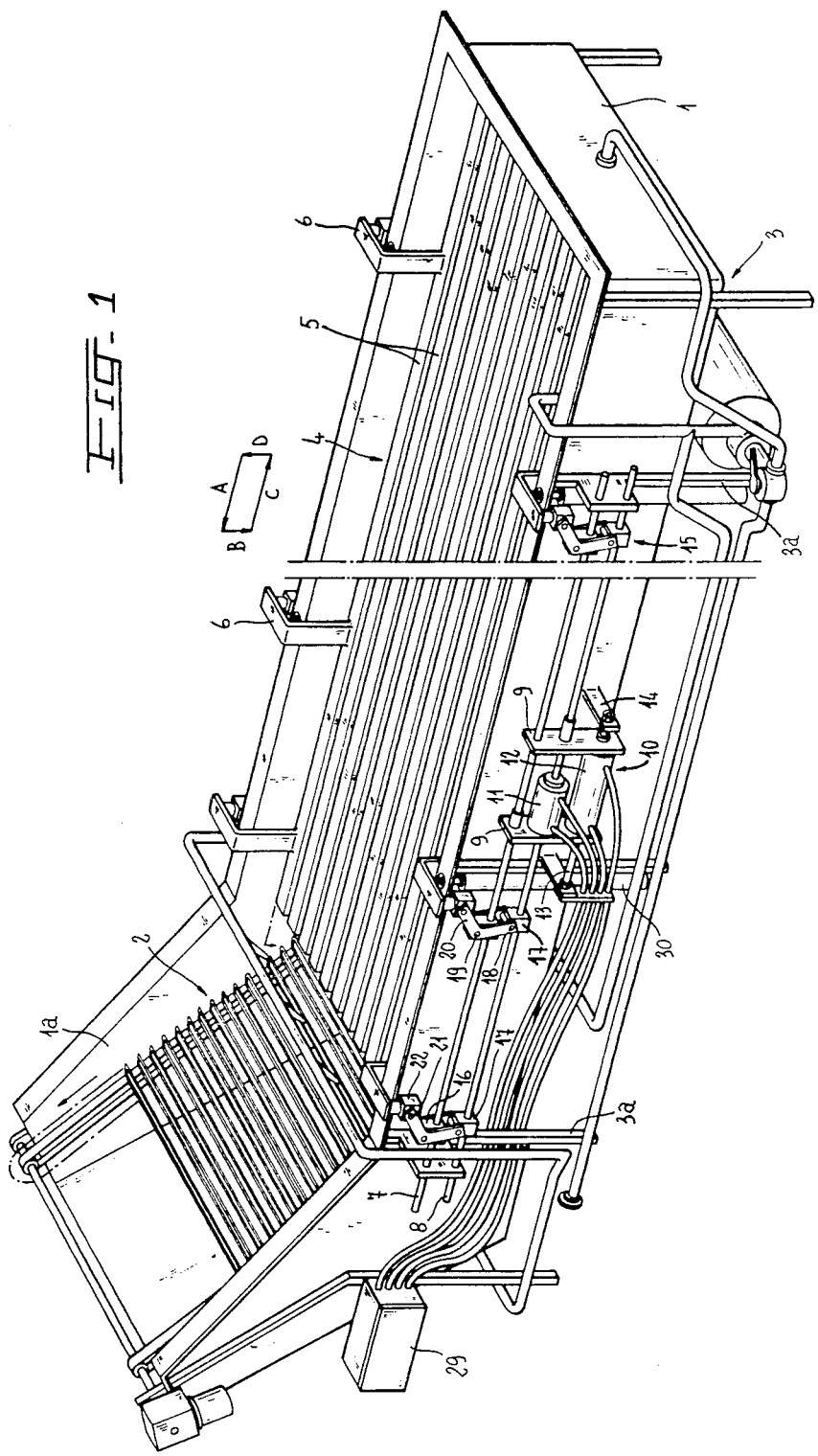

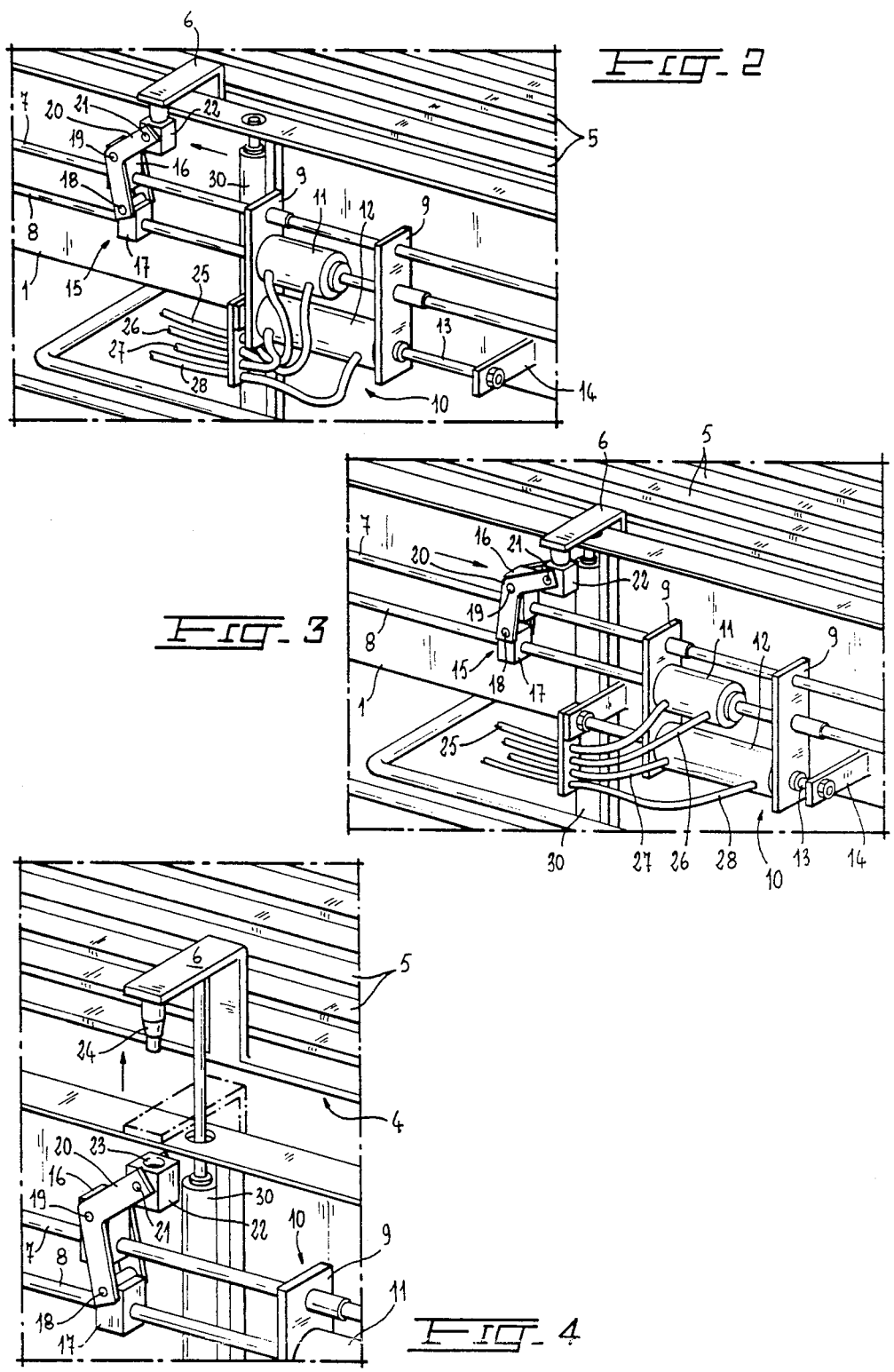

TANK FOR COOLING MOZZARELLA CHEESES

FIELD OF THE INVENTION

A tank for cooling mozzarella cheeses with a closed circuit conveyor belt at the outlet of a machine for molding mozzarella cheeses from stretched cheese paste.

BACKGROUND OF THE INVENTION

Conventional tanks for cooling mozzarella cheeses at the outlet of machines for molding these cheeses which have, after cooling, to be supplied to other devices for subsequent treatments, for example in tanks for preserving baths and/or to packaging machines, are constructed such that they comprise internally a closed circuit conveyor belt of the pan type which extends several meters from one end to the other of the cooling tank.

Although these known tanks provided with such a conveyor belt carry out their cooling task, they present major problems as regards their general cleaning both because of the structure of the conveyor which is usually in the form of articulated plates which provide a conveyor belt of the so-called caterpillar type which has to be removed from the tank, and because of the for the cleaning of the conveyor belt between the articulations between the plates.

In order to remedy these drawbacks of a practical and hygienic nature, attempts have recently been made to replace these so-called caterpillar belts with a band-type conveyor belt, which is easier to clean, actuating it with an alternating operating movement which is slow during the outward stroke and rapid during the return stroke relying on the floating effect of the mozzerella cheeses in order to avoid any hindrance to the forward movement of these cheeses. These systems have not been successful.

OBJECTS OF THE INVENTION

The main object of the present invention is to remedy the above drawbacks by providing an improved cooling tank for mozzarella cheeses of the type having conveyor means intended to make effective use of the floating effect of the mozzarella cheeses, providing these means in the form of a conveyor belt with a closed circuit outward and return movement.

A further object of the invention is, in accordance with the preceding object, to provide these conveyor belt means with a closed circuit outward and return movement with a structure intended to raise them upwardly out of the tank so that the interior of the tank can be cleaned.

A further object of the invention is, in accordance with the preceding objects, to provide such a tank with conveyor belt means with a closed circuit outward and return movement with a structure which is particularly simple and economic in relation to the results which can surprisingly be achieved therewith in practice.

SUMMARY OF THE INVENTION

These and other objects are all achieved with a tank for cooling mozzarella cheeses with conveyor means at the outlet of machines for molding mozzarella cheeses from stretched cheese paste which comprises, this tank being downstream of these conveyor means an upwardly inclined outlet conveyor means section and support bench means for the bench means for the. The tank contains a cooling liquid tank, which tank is characterized in that the conveyor means are formed by transversely spaced longitudinal bars with a connection and support structure with components projecting laterally outwardly from the top of the tank. Externally of this tank, on at least one of the longitudinal sides of the tank, there is supported in a longitudinally slidable manner by the bench support means a corresponding pair of longitudinal bars respectively connected together by support carriage means of a pair of operationally independent actuating means, the bars of at least this one pair of longitudinal bars with the relative associated actuating means being connected to the projecting components so as to cause the conveyor belt with longitudinal bars to perform a closed circuit movement under the action of the actuating means with a slow outward stroke and a rapid return stroke.

BRIEF DESCRIPTION OF THE DRAWING

Further characteristics and advantages of the tank of the invention will be apparent in greater detail from the following description, reference being made to the accompanying drawing, in which:

FIG. 1 is a partial longitudinal perspective view of the tank of the invention seen from the top;

FIGS. 2 and 3 are detail views of the tank of FIG. 1, on an enlarged scale, illustrating two operational stages thereof; and FIG. 4 shows, on a further enlarged scale, the same detail of the tanks of FIGS. 2 and 3 with the conveyor belt in the position in which it is raised out of the tank so that the tank can be cleaned.

SPECIFIC DESCRIPTION

With reference to the drawing, and in particular to FIG. 1, it can be seen that the tank 1 is constructed such as to have its output section 1a extending forward in an upwardly inclined manner, along which section there is disposed a conventional conveyor with transverse strips 2.

This tank 1, 1a is supported by a bench support structure 3.

A conveyor 4 of the invention is disposed inside the tank 1 and extends from the opposite end, i.e. the end at which the mozzarella cheeses to be cooled are input, to the end in which the conveyor 2 is disposed, up to the vicinity of the output conveyor 2 for the cooled mozzarella cheeses.

The conveyor 4 of the invention is formed by transversely spaced longitudinal bars 5 with a support and connection structure with components 6 which project laterally and outwardly from the top of the tank 1.

Externally to the tank 1, via the bench support structure 3 and laterally along the exterior of the longitudinal sides of the tank 1, there is slidably supported by uprights 3a a corresponding pair of longitudinal rods 7 and 8, only the pair disposed on the front longitudinal face of FIG. 1 being visible in the drawing.

Two plates 9 form a carriage 10 fixed to the rod 7, one of these plates being rigid with a hydraulic cylinder 11 whose piston is rigid with the rod 8 which acts as the rod of this piston so as to slide through the plates 9 forming the carriage 10. These plates with the carriage 10 extend below the hydraulic cylinder 11 and between these extensions there is disposed in a fixed manner a hydraulic cylinder 12 provided internally with a diaphragm in the form of a fixed piston (not shown). This hydraulic cylinder 12 and its diaphragm in the form of a piston have a rod 13 passing freely through them, this rod being supported in a fixed manner by two snap-locking parts in the form of brackets 14 projecting from the external wall of the tank 1.

It can be seen from the above that the carriage 10 is rigid with the rod 7 and the two cylindrical cylinders 11 and 12, while the rod 8 slides in the form of a rod for the piston rigid therewith with respect to the cylinder 11 via the plates 9 forming the carriage 10 which is slidably moveable on the rod 13 together with the cylinder 12 in the way which will be described below in further detail.

A plurality of devices 15 which are identical and only one of which will therefore be described here in detail are associated along the rods 7 and 8. A device 15 of this type consists of two blocks 16 and 17 rigid respectively with the rod 7 and the rod 8. On the opposite ends of the two blocks 17 and 18 there is articulated at 18 and 19 at one end and an intermediate point a corresponding lever 20 with two angled arms. The other end of lever 20 is articulated at 21 on a block 22 which is vertically bored at 23 and in which a conical pin 24 extended downwardly from the components projecting from the conveyor 4 is designed to engage in a detachable manner (see FIG. 4 in particular).

In the vicinity of the other ends of the two hydraulic cylinders 11 and 12 there are located respective tubes 25, 26, 27 and 28 connected to a source of hydraulic power and controlled by control components of known type arranged in a box 29.

By means of these control components the belt 4 is caused to start its outward stroke at a slow speed via the hydraulic cylinder 12 and the carriage 10, starting from a raised position shown in FIGS. 1 and 2 and moving from upstream to downstream in the direction of the arrow A with the rod 8 retracted towards the hydraulic cylinder 11 and the devices 15 in the arrangement in which they raise the conveyor 4.

At the end of the outward stroke, the rod 8 is caused to move downwardly by the hydraulic cylinder 11 so as to lower the conveyor 4 in the direction of the arrow B via the devices 15 (see FIG. 3) and the conveyor 4 is brought into the initial upstream position via the hydraulic cylinder 12 and the carraige 10 with a rapid return movement in the direction of the arrow C (see FIG. 1) avoiding any hindrance to the mozzarella cheeses which are gradually being transferred downstream as a result of the floating effect of these cheeses. At this point, still by means of the hydraulic cylinder 11 and the devices 15 the conveyor 4 is again raised in the direction of the arrow D and the carriage 10 is actuated by the hydraulic cylinder 12 for a new forward movement at a slow speed, and so on in order to bring the mozzarella cheese gradually into the area of the conveyor 2 which transports them for further processing.

As mentioned above, the invention also makes it possible to raise the belt 4 above the surface of the tank 1 so that it can be cleaned. For this purpose there are provided hydraulic cylinders 30 or lifting jacks with the free ends of the rod of the respective piston being anchored to a component 6 of the conveyor 4 projecting from the tank 1 (see FIG. 4 in particular).

In operation, the mozzarella cheeses are placed in a bath of cooling liquid in the tank 1 and tend to float therein to advance the mozzarella cheeses along the conveyor formed by the array of bars 5, the array of bars is lifted (arrow D in FIG. 1), shifted to the left (arrow A in FIG. 1), lowered (arrow B in FIG. 1) and shifted to the right (arrow C in FIG. 1), thereby carrying the mozzarella cheeses to the transverse-slat conveyor 2 which lifts the mozzarella cheeses out of the tank.

A tank for cooling mozzarella cheeses with a closed circuit conveyor conveyor formed in this way has made it possible in practice to achieve all the predetermined objects, without prejudice to the fact that the description of the tank in question made with reference to the attached drawing is given purely by way of non-limiting example and it is therefore evident that any modifications or variants suggested by practice and by its embodiment and use may be made thereto without departing from the scope of the following claims.

I claim:

1. An apparatus for cooling mozzarella cheese, comprising:
   a support;
   means on said support forming an upwardly open elongated tank receiving a cooling liquid;
   means at one end of said tank forming an upwardly inclined conveyor section for lifting mozzarella cheeses from said tank; and
   a longitudinal conveyor for displacing mozzarella cheeses along said tank toward said one end, said longitudinal conveyor comprising:
   an array of interconnected transversely spaced longitudinally extending parallel bars,
   a plurality of components connected to said array and extending upwardly and outwardly over longitudinal edges of said tank,
   a pair of relatively shiftable rods along at least one side of said tank and provided with first actuating means for displacing said pair of rods in a longitudinal direction and second actuating means for shifting said rods relative to one another, and
   means operatively connecting said pair of rods and said components for displacing said array relatively slowly in a closed-circuit movement toward said upwardly inclined conveyor section in a raised position of said array carrying said mozzarella cheeses, for then lowering said array whereby said mozzarella cheeses are floated, for thereafter displacing said array relatively rapidly away from said upwardly inclined conveyor section, and for then lifting said array to lift said mozzarella cheeses whereby said mozzarella cheeses are transported on said array.

2. The apparatus defined in claim 1, further comprising jack means engageable with said components for lifting said array above a surface of said tank to enable cleaning of said array.

3. The apparatus defined in claim 1 wherein said means operatively connecting said pair of rods to said components include articulated elements.

4. The apparatus defined in claim 3 wherein said means operatively connecting said pair of rods to said components include a respective block connected to each of said rods and said articulated elements are bent-arm levers each articulated to one of the blocks on each of said rods.

5. The apparatus defined in claim 4 wherein said levers have further blocks on free ends thereof, each of said components having a downwardly extending pin receivable in a hole formed in the respective further block.

6. The apparatus defined in claim 5 wherein actuating means are hydraulic cylinders.

7. The apparatus defined in claim 6, further comprising jack means engageable with said components for lifting said array above a surface of said tank to enable cleaning of said array.

* * * * *